United States Patent
Liu et al.

(10) Patent No.: US 11,271,444 B2
(45) Date of Patent: Mar. 8, 2022

(54) MOTOR ROTOR ASSEMBLY STRUCTURE

(71) Applicant: HEFEI JEE POWER SYSTEMS Co., Ltd., Anhui (CN)

(72) Inventors: Lei Liu, Anhui (CN); Jialun Fan, Anhui (CN); Chunzhe Sun, Anhui (CN); Yuehua Li, Anhui (CN); Jingwei Cui, Anhui (CN)

(73) Assignee: Hefei Jee Power Systems, Co., Ltd., Anhui (CN)

( * ) Notice: Subject to any disclaimer, the term of this patent is extended or adjusted under 35 U.S.C. 154(b) by 78 days.

(21) Appl. No.: 16/760,135

(22) PCT Filed: Dec. 26, 2018

(86) PCT No.: PCT/CN2018/123762
§ 371 (c)(1),
(2) Date: Apr. 29, 2020

(87) PCT Pub. No.: WO2019/214252
PCT Pub. Date: Nov. 14, 2019

(65) Prior Publication Data
US 2020/0350794 A1   Nov. 5, 2020

(30) Foreign Application Priority Data

May 11, 2018   (CN) .......................... 201810446931.2

(51) Int. Cl.
*H02K 1/27*   (2006.01)
*H02K 1/28*   (2006.01)
*H02K 1/276*   (2022.01)

(52) U.S. Cl.
CPC ............... *H02K 1/28* (2013.01); *H02K 1/276* (2013.01)

(58) Field of Classification Search
CPC ........ H02K 1/28; H02K 1/276; H02K 1/2766; H02K 2213/03; H02K 1/22
See application file for complete search history.

(56) References Cited

U.S. PATENT DOCUMENTS

| 2009/0261667 | A1* | 10/2009 | Matsubara | ........... H02K 1/2766 310/54 |
| 2009/0315423 | A1* | 12/2009 | Suzuki | ................... H02K 1/276 310/156.12 |
| 2017/0085160 | A1* | 3/2017 | Mae | ..................... H02K 1/2706 |

FOREIGN PATENT DOCUMENTS

| CN | 103779993 A |   | 5/2014 |
| CN | 104935124 A | * | 9/2015 |

(Continued)

OTHER PUBLICATIONS

Machine Translation, XU, CN-104935124-A, Sep. 2015. (Year: 2015).*

*Primary Examiner* — Thomas Truong
(74) *Attorney, Agent, or Firm* — Craft Chu PLLC; Andrew W. Chu

(57) ABSTRACT

The motor rotor assembly structure includes a rotating shaft, a plurality of rotor cores formed by a plurality of rotor punches neatly laminated, and rotor pressure plates installed at front and rear ends of the rotor core. The rotor core is provided with a shaft hole for mounting the rotating shaft in the middle in an axial direction. Two rotor pressure plates press the plurality of rotor punches. The rotating shaft is a hollow shaft. The plurality of rotor punches has the same structure. Each of the rotor punches is provided with a plurality of sets of positioning holes. The plurality of rotor punches is positioned and fixed to the rotating shaft through the plurality of sets of positioning holes to realize oblique poles between rotor segments. The motor rotor assembly structure is made by laminating one type of rotor punches.

4 Claims, 3 Drawing Sheets

(56) References Cited

FOREIGN PATENT DOCUMENTS

| CN | 105529849 | A | 4/2016 |
| CN | 107070023 | A | 8/2017 |
| CN | 108448762 | A | 8/2018 |
| JP | H1118339 | A | 1/1989 |

* cited by examiner

MOTOR ROTOR ASSEMBLY STRUCTURE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a motor structure, and in particular to a motor rotor assembly structure.

2. Description of Related Art Including Information Disclosed Under 37 CFR 1.97 and 37 CFR 1.98.

In a common motor rotor structure of the prior art, one type of rotor punches ensures oblique poles between rotor segments by cooperating with a plurality of slots with different angles on the shaft. This structure requires a key to be designed on the punch, and a keyway to be machined on the shaft. Due to the different angles of the oblique poles, and limited by the space effect of the shaft diameter, the keyway cannot be machined symmetrically in the axial direction. Such a structural design has the following disadvantages: 1) the existence of multiple keyways on the motor shaft will increase the machining volume of the shaft, and at the same time multiple keyways will reduce the strength of the shaft; 2) the keyways on the shaft are limited by the structural space, and cannot be symmetrically machined, and it is difficult to ensure that the center of gravity does not shift after the final machining, thereby ensuring the accuracy level of the rotor dynamic balance; and 3) the keyways on the motor shaft cannot realize hollow shaft design solutions through low-cost processes but can only be ensured through a machining method. Therefore, the present invention solves the above problems by improving the rotor punch structure.

BRIEF SUMMARY OF THE INVENTION

An object of the present invention is to provide a motor rotor assembly structure that does not need any keyways on a rotating shaft, and designs multiple sets of oblique pole positioning holes on the same type of rotor punch structures.

The technical solution of the present invention is: a motor rotor assembly structure, including a rotating shaft, a plurality of rotor cores neatly laminated by a plurality of rotor punches, and rotor pressure plates installed at front and rear ends of the rotor core, wherein the rotor core is provided with a shaft hole for mounting the rotating shaft in the middle in an axial direction, and two of the rotor pressure plates are configured to press the plurality of rotor punches; the rotating shaft is a hollow shaft; the plurality of rotor punches has the same structure; each of the rotor punches is provided with a plurality of sets of positioning holes; and the plurality of rotor punches is positioned and fixed to the rotating shaft through the plurality of sets of positioning holes to realize oblique poles between rotor segments.

As a preferred technical solution, each set of positioning holes is composed of two positioning holes that are symmetrical with respect to an axis.

As a preferred technical solution, there are five sets of positioning holes, respectively referred to as positioning holes I, positioning holes II, positioning holes III, positioning holes IV, and positioning holes V; and each of the rotor punches has a front side and a back side, and the front and back sides of the rotor punch are provided with front and back identifications, respectively referred to as side A and side B.

Each of the rotor punches takes a center line as a reference on the front side, a counterclockwise angle between one positioning hole I and the center line is 1° to 3°, a clockwise angle between an adjacent positioning hole I and a positioning hole II is 42° to 46°, a clockwise angle between an adjacent positioning hole II and a positioning hole III is 41° to 45°, a clockwise angle between an adjacent positioning hole III and a positioning hole IV is 8° to 12°, a clockwise angle between an adjacent positioning hole IV and a positioning hole V is 40° to 44°, and a clockwise angle between an adjacent positioning hole V and the other positioning hole I is 39° to 43°.

As a preferred technical solution, each of the rotor punches takes the center line as a reference on the front side, a counterclockwise angle between one positioning hole I and the center line is 1°, a clockwise angle between an adjacent positioning hole I and a positioning hole II is 44°, a clockwise angle between an adjacent positioning hole II and a positioning hole III is 43°, a clockwise angle between an adjacent positioning hole III and a positioning hole IV is 10°, a clockwise angle between an adjacent positioning hole IV and a positioning hole V is 42°, and a clockwise angle between an adjacent positioning hole V and the other positioning hole I is 41°.

As a preferred technical solution, there are six rotor cores, and the upper surfaces of the rotor cores are stacked sequentially from bottom to top in an order of B-side positioning hole III→B-side positioning hole II→A-side positioning hole I→B-side positioning hole I→A-side positioning hole V→A-side positioning hole IV to form a rotor core assembly.

As a preferred technical solution, the rotor core is in interference fit with the rotating shaft; and two of the rotor pressure plates are in clearance fit with the rotating shaft, and the rotor punches are pressed tightly through mating of screws and nuts.

The advantages of the present invention include:

1) The rotor core in the present invention is formed by laminating one type of rotor punches, which reduces the types of rotor punches, reduces the cost of molding the rotor punch, and effectively reduces the total cost;

2) The rotating shaft in the present invention does not need to open any keyways, so the rotating shaft can be designed as a hollow shaft. Hollow shaft design requirements can be achieved through a variety of low-cost processes, such as cold spin forging or forging and welding processes to reduce the overall weight of the motor while saving materials and costs;

3) Since no keyway needs to be opened on the rotating shaft, the rotating shaft structure can be designed to be symmetrical along the axis center to ensure that the center of gravity is not shifted after the final processing, and the center of gravity of the rotor punch structure is designed to be in the axis, ensuring that the center of gravity of the motor rotor core assembly will not shift, thereby ensuring the accuracy of the rotor dynamic balance.

BRIEF DESCRIPTION OF THE SEVERAL VIEWS OF THE DRAWINGS

The present invention is further described below with reference to the drawings and embodiments.

Figure 1:
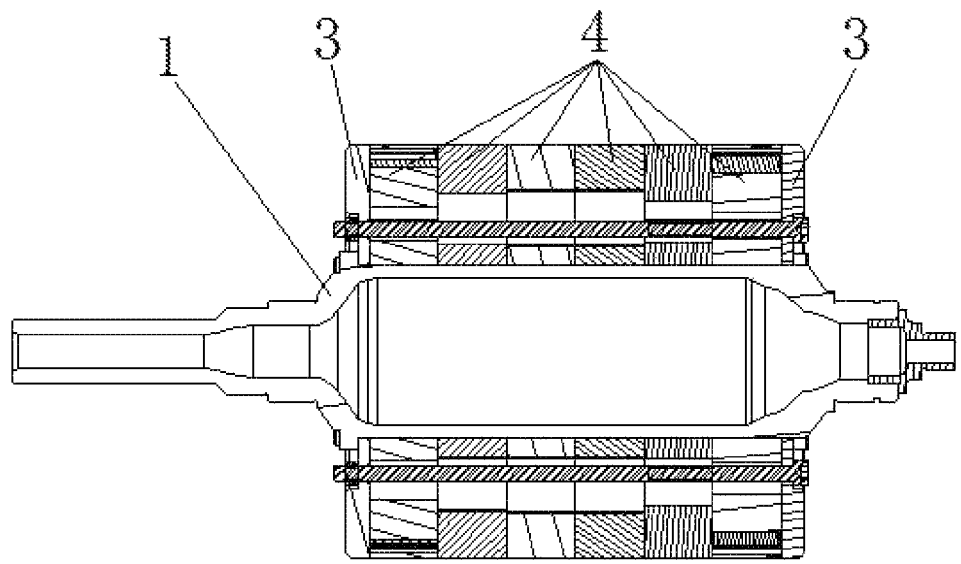
FIG. 1 is a schematic view of a structural diagram of a motor rotor assembly structure according to the present invention.

In the drawings: 1, rotating shaft; 2, rotor punch; 3, rotor pressure plate; 4, rotor core; 51, positioning hole I; 52, positioning hole II; 53, positioning hole III; 54, positioning hole IV; 55, positioning hole V; 6, front and back identifications; 7, center line.

DETAILED DESCRIPTION OF THE INVENTION

Embodiments

Figure 2:
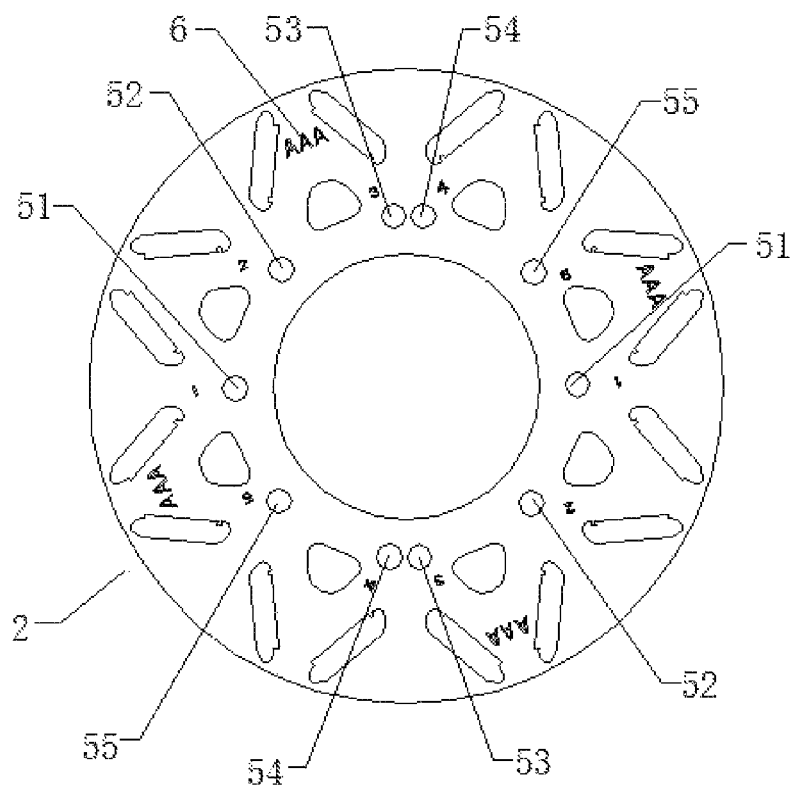
FIG. 2 is a schematic view of a structural diagram of a rotor punch in the present invention.

As shown in FIGS. 1 and 2, a motor rotor assembly structure includes a rotating shaft 1, a plurality of rotor cores 4 formed by a plurality of rotor punches 2 neatly laminated, and rotor pressure plates 3 installed at front and rear ends of the rotor core 4. A shaft hole for installing the rotating shaft 1 is provided in the middle in axial direction (shaft axial direction) of the rotor core. Two rotor pressure plates 3 are configured to press the plurality of rotor punches 2. The rotating shaft 1 is a hollow shaft (hollow shaft body). The plurality of rotor punches 2 has the same structure. Each of the rotor punches 2 is provided with a plurality of sets of positioning holes. The plurality of rotor punches 2 is positioned and fixed to the rotating shaft 1 through the plurality of sets of positioning holes to realize oblique poles between rotor segments.

Figure 3:
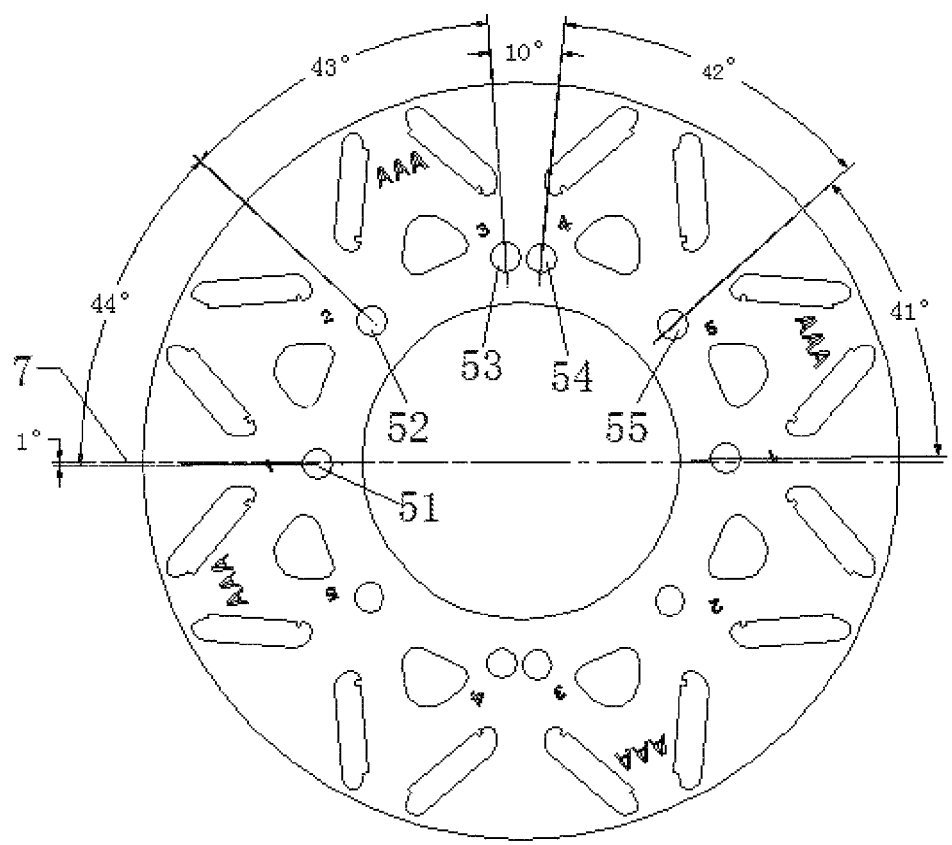
FIG. 3 is a schematic view of a diagram showing the position distribution of each positioning hole on a rotor punch in the present invention.

As shown in FIGS. 2 to 3, each set of positioning holes consists of two positioning holes that are symmetrical with respect to an axis. There are five sets of positioning holes, respectively referred to as positioning holes I (first positioning hole) 51, positioning holes II (second positioning hole) 52, positioning holes III (third positioning hole) 53, positioning hole IV (fourth positioning hole) 54, and positioning hole V (fifth positioning hole) 55. Each of the rotor punches 2 has front and back sides, and the front and back sides of the rotor punch are provided with front and back side identifications 6, respectively reference to as side A and side B. Each of the rotor punches 2 takes a center line 7 as a reference on the front side. A counterclockwise angle between one positioning hole I (first positioning hole) 51 and the center line 7 is 1°, a clockwise angle between an adjacent positioning hole I (first positioning hole) 51 and a positioning hole II (second positioning hole) 52 is 44°, a clockwise angle between an adjacent positioning hole II (second positioning hole) 52 and a positioning hole III (third positioning hole) 53 is 43°, a clockwise angle between an adjacent positioning hole III (third positioning hole) 53 and a positioning hole IV (fourth positioning hole) 54 is 10°, a clockwise angle between an adjacent positioning hole IV (fourth positioning hole) 54 and a positioning hole V (fifth positioning hole) 55 is 42°, and a clockwise angle between an adjacent positioning hole V (fifth positioning hole) 55 and the other positioning hole I 51 is 41°.

Figure 4:
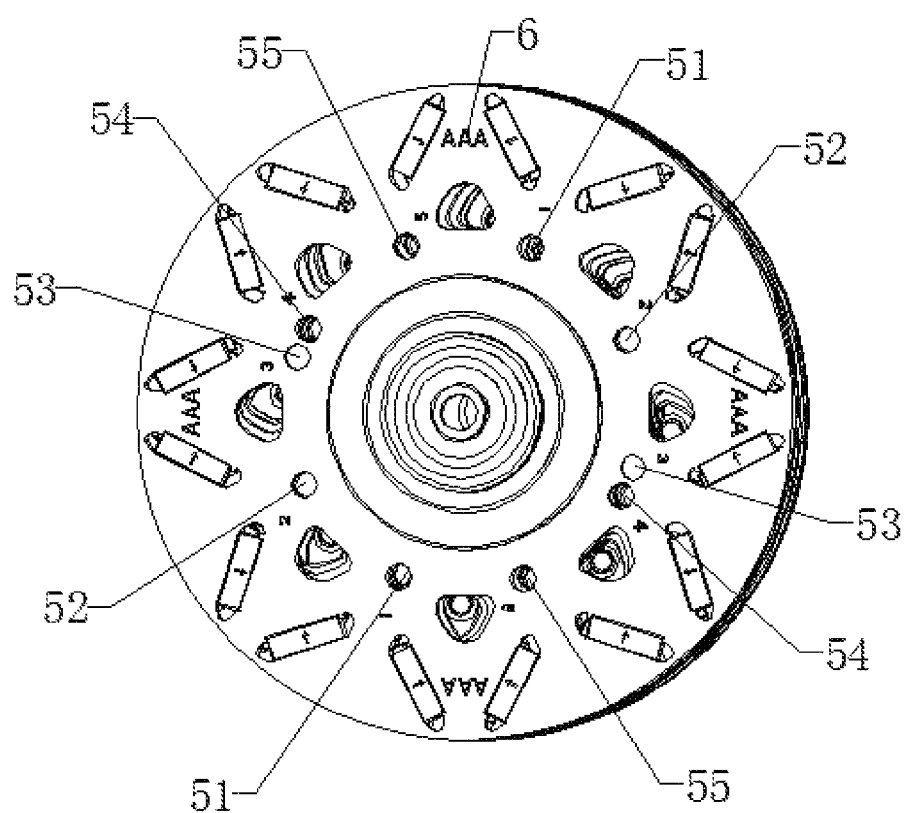
FIG. 4 is a schematic view of a structural diagram of a rotor core assembly formed by laminating a plurality of rotor cores in the present invention.

As shown in FIGS. 2 to 4, there are six rotor cores 4 (first rotor core, second rotor core, third rotor core, fourth rotor core, fifth rotor core, and sixth rotor core). When a rotor core assembly is assembled, it is installed through the matching between the numbered positioning holes and the front and back sides of the rotor punches. Weight-removal holes are opened on each rotor core to ensure oblique poles. The upper surfaces of the six rotor cores are stacked sequentially from bottom to top in an order of B-side positioning hole III 53→B-side positioning hole II 52→A-side positioning hole I 51→B-side positioning hole I 51→A-side positioning hole V 55→A-side positioning hole IV 54 to form the rotor core assembly, which realizes the inclination angles of a, a, a/2, a, and a between the rotor cores.

As shown in FIG. 1, the rotor iron core is in interference fit with the rotating shaft 1, the two rotor pressure plates 3 are in clearance fit with the rotating shaft 1, and the rotor punches are pressed by mating of screws and nuts. It can also be designed and adjusted to directly open corresponding threaded holes in one of the rotor pressure plates to fix the bolts.

The above-mentioned embodiments merely illustrate the principle of the present invention and its effects, but are not intended to limit the present invention. Those skilled in the art can modify or change the above embodiments without departing from the spirit and scope of the present invention. Therefore, all equivalent modifications or changes made by those skilled in the art without departing from the disclosed spirit and technical ideas of the present invention should still be covered by the claims of the present invention.

We claim:

1. A motor rotor assembly structure, comprising:
    a rotating shaft, having a shaft axial direction and being comprised of a hollow shaft body;
    a plurality of rotor cores being comprised of a plurality of rotor punches, each rotor core having a shaft hole and being mounted on said rotating shaft by a respective shaft hole in said shaft axial direction, said rotor cores being mounted on said rotating shaft so as to form a front end and a rear end opposite said front end; and
    rotor pressure plates installed at said front end and said rear end so as to press said plurality of rotor punches,
    wherein said rotor punches have identical structures,
    wherein each rotor punch is provided with a plurality of sets of positioning holes, each rotor punch being laminated,
    wherein said rotor punches are positioned and fixed to said rotating shaft through respective pluralities of sets of positioning holes so as to form oblique poles between said rotor punches,
    wherein each set of positioning holes is comprised of a positioning hole symmetrical to another positioning hole of another set of positioning holes with respect to an axis of a respective rotor punch, wherein at least one set of positioning holes of said pluralities of sets of positioning holes is comprised of a first positioning hole, a second positioning hole, a third positioning hole, a fourth positioning hole, and a fifth positioning hole, wherein each rotor punch has a front side with a center line and a back side opposite said front side, said front side being comprised of a front identification, said back side being comprised of a back identification, wherein said first positioning hole is at a 1 to 3 degrees counterclockwise angle to a corresponding center line, wherein said first positioning hole is at a 42 to 46 degrees clockwise angle to said second positioning hole, wherein said second positioning hole is at a 41 to 45 degrees clockwise angle to said third positioning hole, wherein said third positioning hole is at an 8 to 12 degrees clockwise angle to said fourth positioning hole, wherein said fourth positioning hole is at a 40 to 44 degrees clockwise angle to said fifth positioning hole, and wherein said fifth positioning hole is at a 39 to 43 degrees clockwise angle to an adjacent positioning hole of an adjacent set of positioning holes.

2. The motor rotor assembly structure according to claim 1, wherein said first positioning hole is at a 1 degree counterclockwise angle to a corresponding center line, wherein said first positioning hole is at a 44 degrees clockwise angle to said second positioning hole, wherein said second positioning hole is at a 43 degrees clockwise angle to said third positioning hole, wherein said third positioning hole is at a 10 degrees clockwise angle to said fourth positioning hole, wherein said fourth positioning hole is at a 42 degrees clockwise angle to said fifth positioning hole, and wherein said fifth positioning hole is at a 41 degrees clockwise angle to an adjacent positioning hole of an adjacent set of positioning holes.

3. The motor rotor assembly structure according to claim 1, wherein said plurality of rotor cores is comprised of a first rotor core, a second rotor core, a third rotor core, a fourth rotor core, a fifth rotor core, and a sixth rotor core being stacked sequentially from bottom to top, wherein said first rotor core has a first rotor punch with a respective back side and a respective third positioning hole, wherein said second rotor core has a second rotor punch with a respective back side and a respective second positioning hole aligned with said respective back side of said respective third positioning hole of said first rotor core, wherein said third rotor core has a third rotor punch with a respective front side and a respective first positioning hole aligned with said respective back side of said respective second positioning hole of said second rotor core, wherein said fourth rotor core has a fourth rotor punch with a respective back side and a respective first positioning hole aligned with said respective front side of said respective first positioning hole of said third rotor core, wherein said fifth rotor core has a fifth rotor punch with a respective front side and a respective fifth positioning hole aligned with said respective back side of said respective first positioning hole of said fourth rotor core, and wherein said sixth rotor core has a sixth rotor punch with a respective front side and a respective fourth positioning hole aligned with said respective front side of said respective fifth positioning hole of said fifth rotor core so as to form a rotor core assembly.

4. The motor rotor assembly structure according to claim 1, wherein each rotor core is in interference fit with said rotating shaft, wherein said rotor pressure plates are comprised of a first rotor pressure plate and a second rotor pressure plate rotatable around said rotating shaft, and wherein said rotor punches are pressed between said rotor pressure plates by screws mated to corresponding nuts.

* * * * *